(12) United States Patent
Lee et al.

(10) Patent No.: US 8,627,314 B2
(45) Date of Patent: Jan. 7, 2014

(54) METHOD FOR MANAGING POWER OF HOST COMPUTER

(75) Inventors: Chung-I Lee, New Taipei (TW); Chien-Fa Yeh, New Taipei (TW); Chiu-Hua Lu, New Taipei (TW); Tsung-Hsin Yen, New Taipei (TW); Chien-Chih Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/447,288

(22) Filed: Apr. 16, 2012

(65) Prior Publication Data

US 2013/0024860 A1  Jan. 24, 2013

(30) Foreign Application Priority Data

Jul. 21, 2011  (TW) .............................. 100125811 A

(51) Int. Cl.
*G06F 9/455* (2006.01)
(52) U.S. Cl.
USPC ............................................................ 718/1
(58) Field of Classification Search
USPC ............................................. 718/1; 713/310
See application file for complete search history.

(56) References Cited

U.S. PATENT DOCUMENTS

| 2010/0070784 | A1* | 3/2010 | Gupta et al. | 713/310 |
| 2010/0262964 | A1* | 10/2010 | Uyeda et al. | 718/1 |
| 2011/0191477 | A1* | 8/2011 | Zhang et al. | 709/226 |
| 2012/0297236 | A1* | 11/2012 | Ziskind et al. | 714/3 |
| 2012/0324441 | A1* | 12/2012 | Gulati et al. | 718/1 |

FOREIGN PATENT DOCUMENTS

| JP | 2010134687 A | 6/2010 |
| JP | 2010262382 A | 11/2010 |
| WO | 2010140183 A1 | 12/2010 |

\* cited by examiner

*Primary Examiner* — Emerson Puente
*Assistant Examiner* — Charlie Sun
(74) *Attorney, Agent, or Firm* — Altis Law Group, Inc.

(57) ABSTRACT

In a method for managing power of host computers using a control computer, the method generates a power management command, groups virtual machines installed in the host computers at a first time if the power management command is a first type, to obtain a first group of the virtual machines. The method further relocates the virtual machines in the host computers based on the first group of the virtual machines, and closes idle host computers. Closed host computers are powered on if the power management command is the second type, all the virtual machines at a second time are grouped, to obtain a second group of the virtual machines. The virtual machines are relocated into each host computer based on the second group of the virtual machines.

19 Claims, 7 Drawing Sheets

METHOD FOR MANAGING POWER OF HOST COMPUTER

BACKGROUND

1. Technical Field

Embodiments of the present disclosure relate to cloud computing technology, and particularly to a control computer and method for managing power of virtual machines installed in host computers.

2. Description of Related Art

In cloud computing technology, a storage container includes a plurality of host computers, where each host computer is installed with a plurality of virtual machines (VMs) that provide multiple services to users. Because each host computer needs an individual power supply, the power consumption of the storage container is great. Therefore, an efficient method for managing power of virtual machines installed in host computers is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
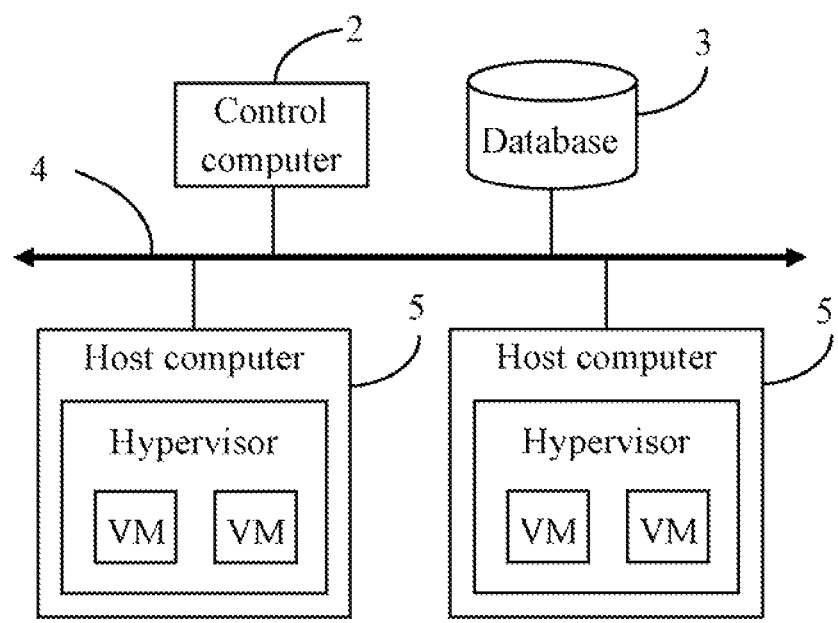
FIG. 1 is a schematic diagram of one embodiment of a control computer electronically connected with a plurality of host computers.

FIG. 1 is a schematic diagram of one embodiment of a control computer 2 electronically connected with a plurality of host computers (hereinafter referred to as "hosts") 5. The control computer 2 is connected to the host computers 5 and a database 3 through a network 4. For example, the network 4 may be the Internet, an intranet, or any other relevant network.

Figure 5:
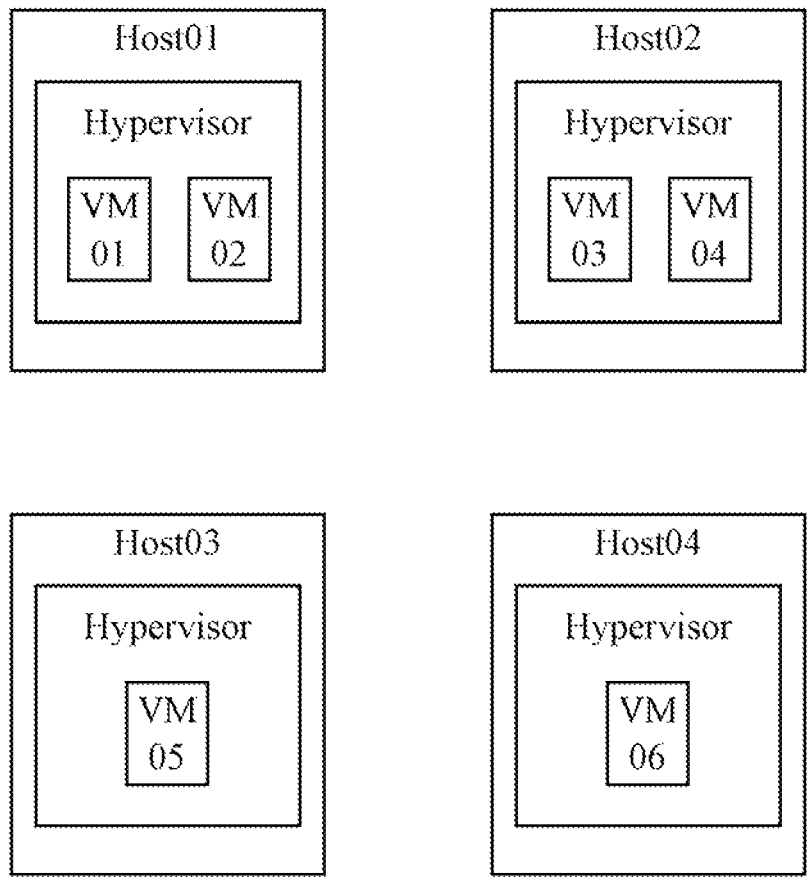
FIG. 5 is a schematic diagram of one embodiment of a plurality of virtual machines installed in the host computers.

In one embodiment, the host computers 5 are located in a storage container of a specific space. Each host computer 5 is installed with a plurality of virtual machines (VMs) that provide services to users. For example, as shown in FIG. 5, the virtual machines "VM01" and "VM02" are installed in the host computer "Host01," the virtual machines "VM03" and "VM04" are installed in the host computer "Host02," the virtual machine "VM05" is installed in the host computer "Host03," and he virtual machine "VM06" is installed in the host computer "Host04".

The database 3 stores information of the virtual machines, such as a name, an identifier (ID), and a resource usage (or resource usage rate) of each of the virtual machines. For example, the resource usage may include a central processing unit (CPU) usage, a network bandwidth usage, a hard disk usage, and a memory usage of the host computer 5 occupied by the virtual machines.

Figure 2:
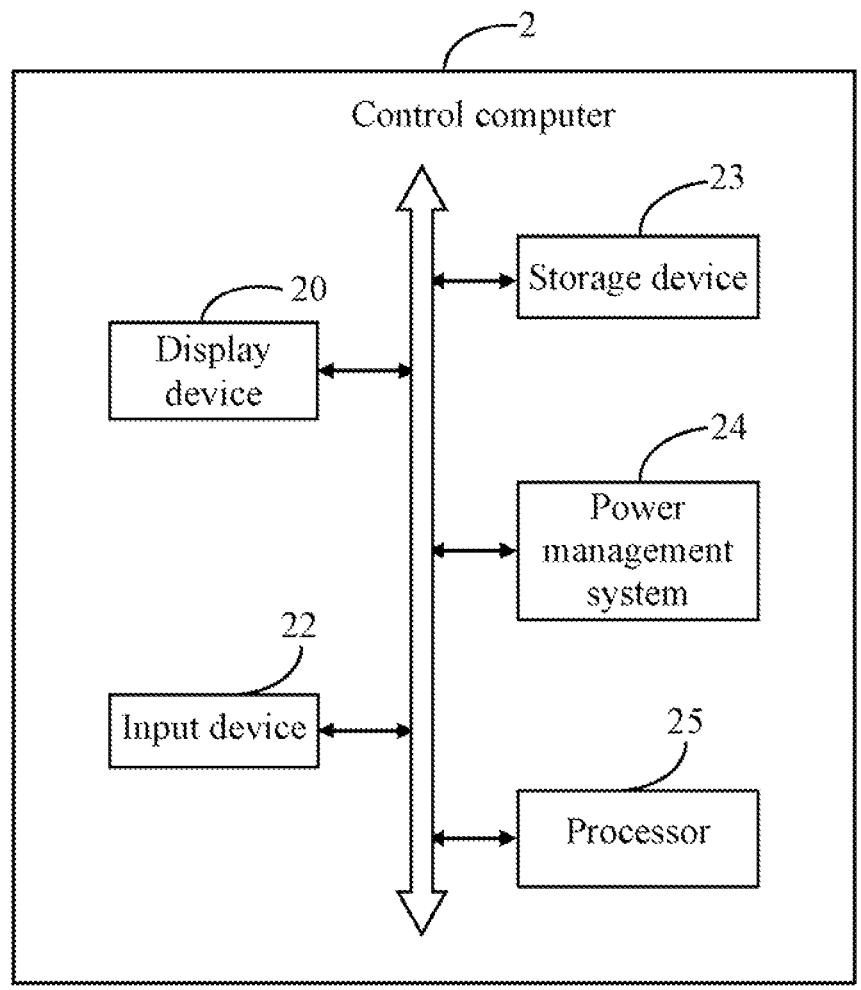
FIG. 2 is a block diagram of one embodiment of the control computer including a power management system.

FIG. 2 is a block diagram of one embodiment of the control computer 2 including a power management system 24. The control computer 2 further includes a display device 20, an input device 22, a storage device 23, and at least one processor 25. The control computer 2 may be a computer, a server, or any other computing device. FIG. 2 illustrates only one example of the control computer 2 that may include more or fewer components than as illustrated, or a different configuration of the various components may exist in other embodiments.

The display device 20 may be a liquid crystal display (LCD) or a cathode ray tube (CRT) display, and the input device 22 may be a mouse, a keyboard, a touch screen, and/or a touchpad used for inputting data.

The power management system 24 is used to send a power management command to the host computers 5, and control the host computers 5 power on or power off according to the power management command In one embodiment, the power management system 24 may include computerized instructions in the form of one or more programs that are executed by the at least one processor 25 and stored in the storage device 23 (or memory). A detailed description of the power management system 24 will be given in the following paragraphs.

Figure 3:
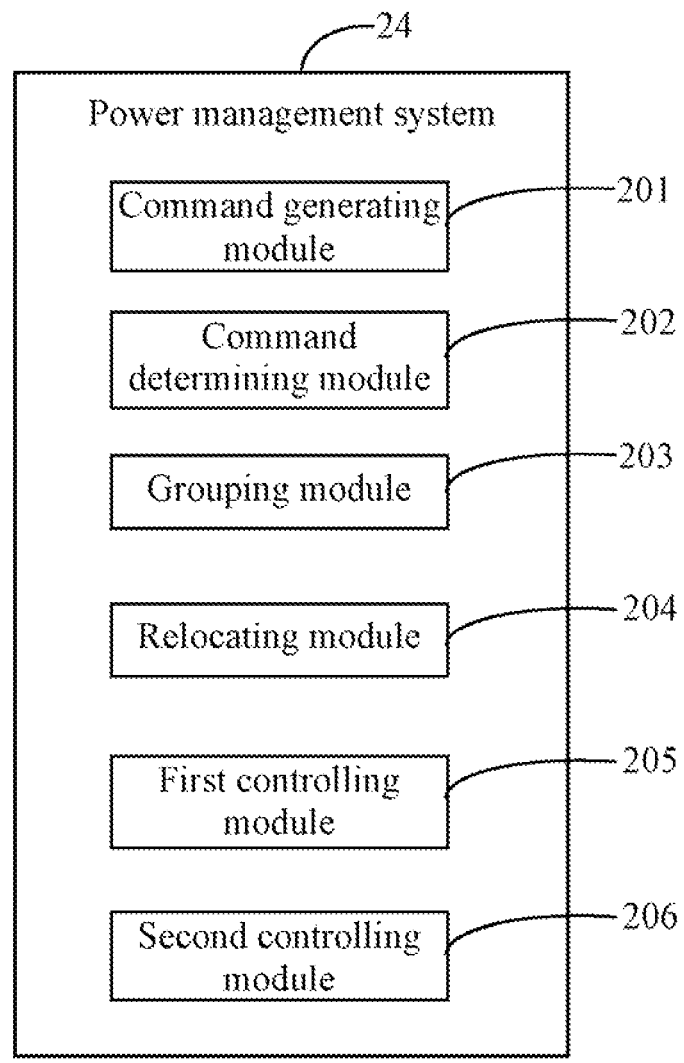
FIG. 3 is a block diagram of function modules of the power management system included in the control computer.

FIG. 3 is a block diagram of function modules of the power management system 24 included in the control computer 2. In one embodiment, the power management system 24 may include one or more modules, for example, a command generating module 201, a command determining module 202, a grouping module 203, a relocating module 204, a first controlling module 205, and a second controlling module 206. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 4:
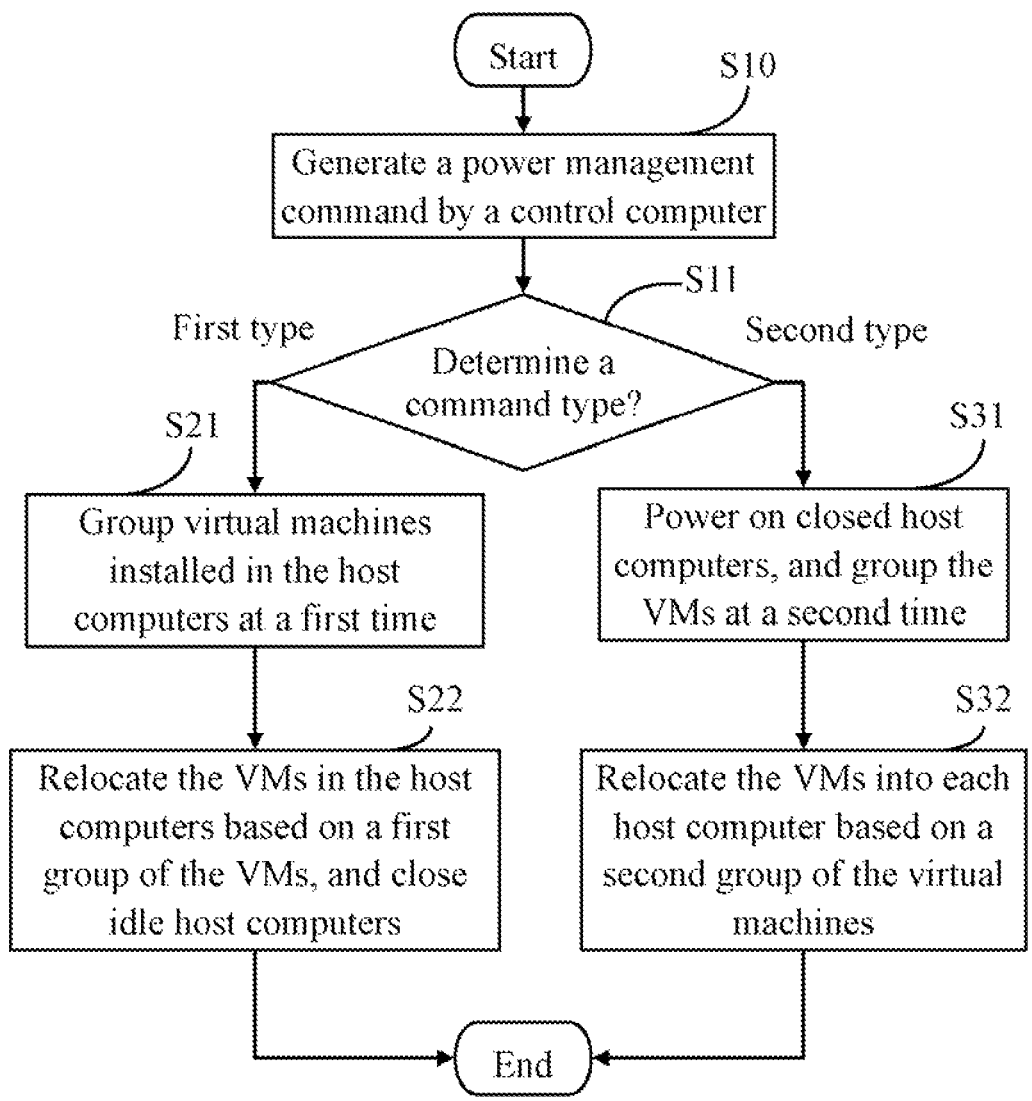
FIG. 4 is a flowchart of one embodiment of a method for managing power of the host computers using the control computer.

FIG. 4 is a flowchart of one embodiment of a method for managing power of the host computers 5 using the control computer 2. Depending on the embodiment, additional blocks may be added, others removed, and the ordering of the blocks may be changed.

In block S10, the command generating module 201 generates a power management command for the host computers 5. In one embodiment, the power management command includes a first type for shutting down idle host computers 5 to save power consumption, and a second type for powering on closed host computers 5 to decrease workloads of the host computers 5.

In one embodiment, the power management command is generated when a specific time arrives. For example, if a first specific time (e.g., PM 8:00) arrives, the command generating module 201 sends a power management command of the first type to the host computers 5. If a second specific time (e.g., AM 8:00) arrives, the command generating module 201 sends a power management command of the second type to the host computers 5.

In other embodiment, the command generating module 201 may generate the power management command when the resource usages of the virtual machines match a specific criteria. For example, if the resource usages of the virtual machines in one of the host computers 5 is less than a first value (e.g., 40%), or the resource usage of the virtual machines in all the host computers 5 is less than a second value (e.g., 200%), the command generating module 201 sends the power management command of the first type to the host computers 5. If the resource usages of the virtual machines in one of the host computers 5 is greater than a third value (e.g., 90%), or the resource usage of the virtual machines in all the host computers 5 is greater than a fourth value (e.g., 500%), the command generating module 201 sends the power management command of the second type to the host computers 5. The resource usages are selected from the group including the CPU usage, the network bandwidth usage, the hard disk usage, and the memory usage of the host computer 5 occupied by the virtual machines.

In block S11, the command determining module 202 determines a command type of the power management command. As mentioned above, the command type includes the first type and the second type. If the power management command is the first type, blocks S21-S22 are executed. If the power management command is the second type, blocks S31-S32 are executed.

If the command type is the first type, in block S21, the grouping module 203 groups the virtual machines installed in the host computers 5 in a first group at a first time according to resource usages of the virtual machines. In this embodiment, the word "group" means that divide the virtual machines into a plurality of subsets (sub-groups). For example, the grouping module 203 divides the virtual machines of "VM01, VM02, VM03, VM04, VM05, and VM06" into three sub-groups, such as (VM01, VM02), (VM03, VM04), and (VM05, VM06). An example of obtaining the first group of the virtual machines is provided as following steps a1 to a6. If the virtual machines are grouped at the first time when the first specific time (e.g., PM 8:00) arrives.

Step a1, the grouping module 203 obtains the resource usages of the virtual machines from the host computers 5, and stores a name of each virtual machine and corresponding resource usage into a first data structure. If the resource usage is the CPU usage, the grouping module 203 obtains the CPU usages of each virtual machine using a virtual machine manager in each host computer 5. As shown in FIG. 5, "Hypervisor" represents the virtual machine manager. In one embodiment, the first data structure is a first in first out (FIFO) list used to store the name of the virtual machine and the corresponding CPU usage. For example, the first data structure "CPU Usage List 1" may be represented as: <CPU Usage List 1>(VM01=20%, VM02=15%, VM03=5%, VM04=10%, VM05=30%, VM06=3%). In other embodiment, the obtained CPU usage may be an average value in a specific time length (e.g., PM 6:00-8:00), or an empirical value (e.g., a preset value).

Step a2, the grouping module 203 calculates a summation "$U_{total}$" of the resource usages in the first data structure.

Step a3, the grouping module 203 calculates a first average value "Vavg1" of the resource usage in each host computer 5 used to allocate the virtual machines according to a formula of Vavg1=($U_{total}$÷N1). "N1" represents a number of the host computers 5 being used to allocate the virtual machines. An initial value of "N1" equals to a number "N0" of the host computers need to keep working (hereinafter referred to as "operated host computers"). For example, N0=int ($U_{total}$÷$U_{threshold}$)+1. "$U_{threshold}$" represents a threshold value (e.g., 80%) of the CPU usage, "int ( )" represents a function to obtain a round number of a division value of "$U_{total}$÷$U_{threshold}$". In this example, $U_{total}$=(20%+15%+5%+10%+30%+3%)=83%, then, N0=int(83%÷80%)+1=2. In other embodiment, the number of the operated host computers may be an empirical value, such as N0=3.

Step a4, the grouping module 203 searches for one or more subsets of the virtual machines in the first data structure such that a summation of the resource usages in the searched subset is greater than the first average value "Vavg1," selects a subset whose summation is minimum, and determines the selected subset as one subset of the first group of the virtual machines.

Step a5, if a number of remaining virtual machines in the first data structure is less than or equal to two, the procedure ends, the remaining virtual machines in the first data structure are regarded as one subset of the first group of the virtual machines.

Step a6, if the number of the remaining virtual machines in the first data structure is greater than two, the grouping module 203 removes the virtual machines in the selected subset from the first data structure, executes an operation of N1=N1−1, and the procedure returns to step a2.

Using the above-mentioned steps a1 to a6, the first group of the virtual machines in the first data structure of "CPU Usage List 1" is as follows: (VM01, VM02, VM03), and (VM04, VM05, VM06). "(VM01, VM02, VM03)" represents the first subset of the first group of the virtual machines, and "(VM04, VM05, VM06)" represents the second subset of the first group of the virtual machines.

Figure 6:
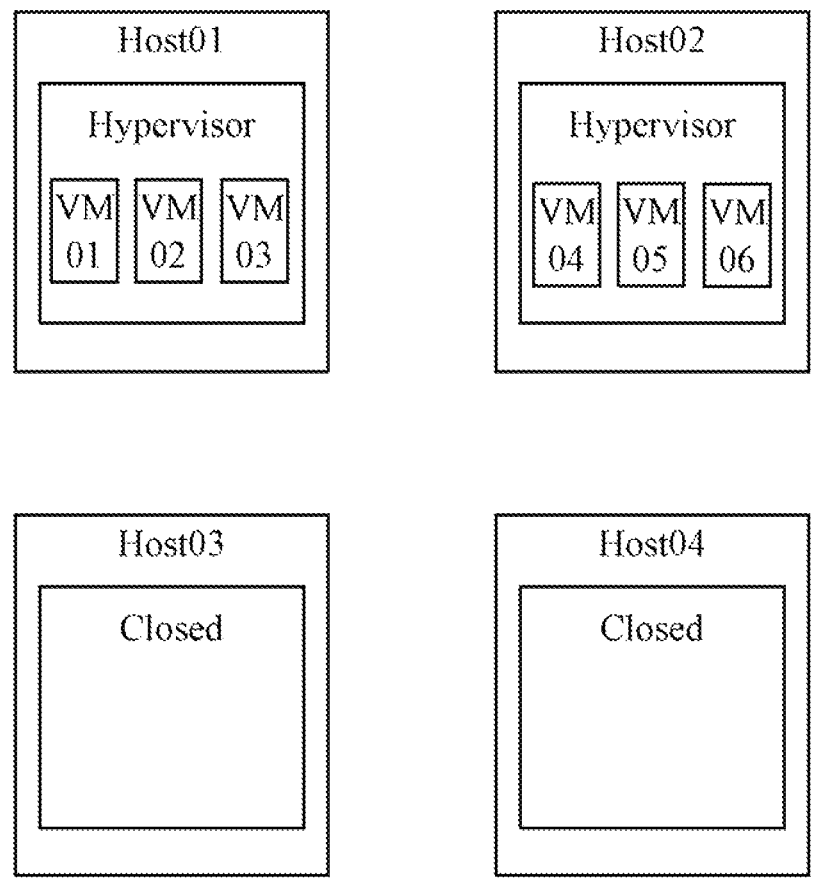
FIG. 6 is a schematic diagram of an example of relocating the virtual machines installed in the host computers according to a first command type.

In block S22, the relocating module 204 relocates the virtual machines in the host computers 5 based on the first group of the virtual machines. Then, the second controlling module 206 closes idle host computers whose virtual machines are removed. For example, as shown in FIG. 6, the virtual machine "VM03" is removed from host computer "Host02" to "Host01," and the virtual machines "VM05" and "VM06" are removed from host computer "Host03" and "Host04" to "Host02." Thus, host computer "Host03" and "Host04" become idle, and are closed by the relocating module 204.

In other embodiment, the relocating module 204 may relocate the first subset (VM01, VM02, VM03) of the first group in the host computer "Host02," and relocate the second subset (VM04, VM05, VM06) of the first group in the host computer "Host01".

If the command type is the second type, in block S31, the first controlling module 205 powers on the closed host computers. The grouping module 203 groups the virtual machines in a second group at a second time according to the resource usages of the virtual machines. An example of obtaining the second group of the virtual machines is provided as following steps b1-b6. If the virtual machines are grouped at the second time when the second specific time (e.g., AM 8:00) arrives. In other embodiment, the first controlling module 205 and the second controlling module 206 can be combined with the grouping module 203 to form one module.

Step b1, the grouping module 203 obtains the resource usages of the virtual machines from the host computers "Host01" and "Host02", and stores the name of each virtual machine and corresponding resource usage into a second data structure. If the resource usage is the CPU usage, the second data structure is the FIFO list used to stores the name of the virtual machine and the corresponding CPU usage. For example, the second data structure "CPU Usage List 2" is represented as: <CPU Usage List 1>(VM01=25%, VM02=20%, VM03=25%, VM04=25%, VM05=50%, VM06=30%). In other embodiments, the obtained CPU usage may be an average value in a specific time length (e.g., AM 7:00-8:00), or an empirical value (e.g., a preset value).

Step b2, the grouping module 203 calculates a summation "$U_{total}$" of the resource usages in the second data structure.

Step b3, the grouping module 203 calculates a second average value "Vavg2" of the resource usage in each host computer 5 used to allocate the virtual machines according to a formula of Vavg2=($U_{total}$÷N2). "N2" represents a number of the host computers 5 used to allocate the virtual machines. An initial value of "N2" equals to a total number of the host computers 5 (e.g., N2=4).

Step b4, the grouping module 203 searches for one or more subsets of the virtual machines in the second data structure such that a summation of the resource usages in the searched subset is greater than the second average value "Vavg2," selects a subset whose summation is minimum, and determines the selected subset as one subset of the second group of the virtual machines.

Step b5, if a number of remaining virtual machines in the second data structure is less than or equal to two, the procedure ends, the remaining virtual machines in the second data structure are regarded as one subset of the second group of the virtual machines.

Step b6, if the number of the remaining virtual machines in the second data structure is greater than two, the grouping module 203 removes the virtual machines in the selected subset from the second data structure, executes an operation of N2=N2−1, and the procedure returns to step b2.

Using the above-mentioned steps b1-b6, the second group of the virtual machines in the second data structure of "CPU Usage List 2" is as follows: (VM01, VM02), (VM03, VM04), and (VM05, VM06). "(VM01, VM02) represents the first subset of the second group of the virtual machines, "(VM03, VM04)" represents the second subset, "(VM05)" represents the third subset, and "(VM06)" represents the fourth subset.

Figure 7:
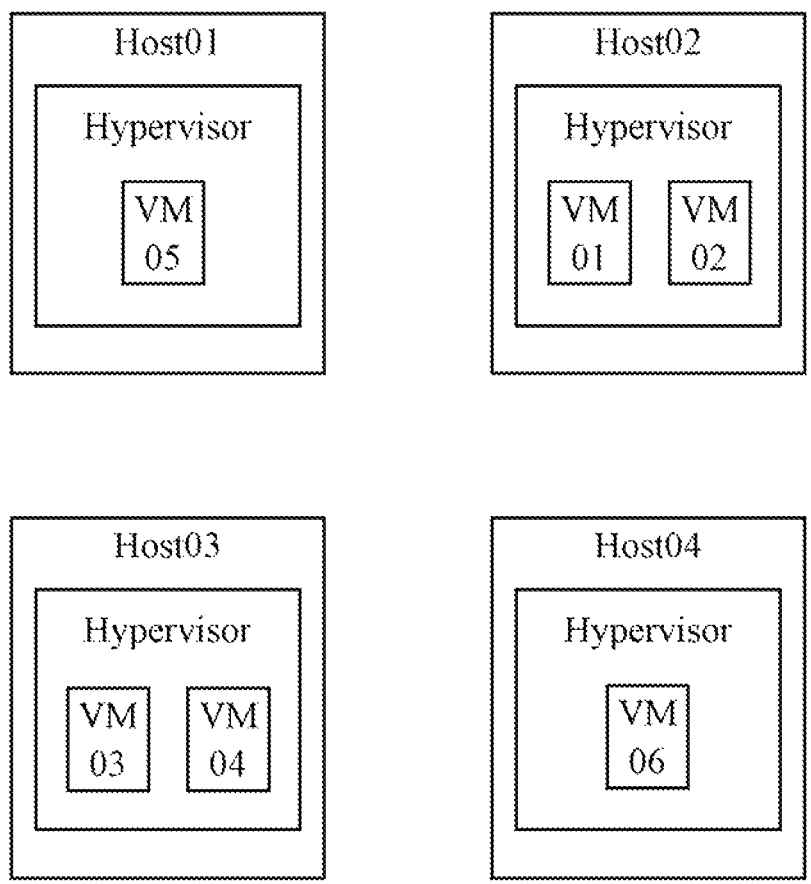
FIG. 7 is a schematic diagram of an example of relocating the virtual machines installed in the host computers according to a second command type.

In block S32, the relocating module 204 relocates the virtual machines into each host computer 5 based on the second group of the virtual machines. For example, as shown in FIG. 7, the virtual machines "VM01" and "VM02" are removed to "Host02," the virtual machines "VM03" and "VM04" are removed to "Host03," the virtual machine "VM05" is removed to "Host01," and the virtual machine "VM06" is removed to "Host04".

In other embodiments, the relocating module 204 may relocate the first subset (VM01, VM02) in the host computer "Host01," relocate the second subset (VM03, VM04) in the host computer "Host02," relocate the third subset (VM05) in the host computer "Host03," and relocate the fourth subset (VM06) in the host computer "Host04".

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for managing power of a plurality of host computers using a control computer comprising a processor, the method comprising execution of the steps comprising:
   generating a power management command for the plurality of host computers by the control computer;
   determining a command type of the power management command, the command type comprising a first type and a second type;
   grouping virtual machines installed in the plurality of host computers in a first group at a first time according to an average value of resource usages of the virtual machines upon the condition that the command type is the first type, the first group of the virtual machines being obtained by searching for one or more subsets of the virtual machines such that a summation of the resource usages in the searched subset is greater than the average value, selecting a subset whose summation is minimum, and determining the selected subset as one subset of the first group of the virtual machines;
   relocating the virtual machines in the host computers based on the first group of the virtual machines, and closing idle host computers that do not include any virtual machine;
   powering on closed host computers upon the condition that the command type is the second type, grouping the virtual machines in a second group at a second time according to the resource usages of the virtual machines; and
   relocating the virtual machines into each of the plurality of host computers based on the second group of the virtual machines.

2. The method according to claim 1, wherein the power management command is generated upon the condition that a specific time arrives or the resource usages of the virtual machines matches a specific criteria.

3. The method according to claim 1, wherein the first group of the virtual machines is obtained by:
   (a1) obtaining the resource usages of the virtual machines from the host computers, and storing a name of each of the virtual machines and corresponding resource usage into a first data structure;
   (a2) calculating a summation "$U_{total}$" of the resource usages in the first data structure;
   (a3) calculating a first average value "Vavg1" of the resource usage of each of the host computers used to allocate the virtual machines according to a formula of Vavg1=$U_{total}$÷N1, wherein "N1" represents a number of the host computers used to allocate the virtual machines, an initial value of "N1" equal to a number "N0" of the host computers need to keep working;
   (a4) searching for one or more subsets of the virtual machines in the first data structure such that a summation of the resource usages in the searched subset is greater than the first average value "Vavg1," selecting a subset whose summation is minimum, and determining the selected subset as one subset of the first group of the virtual machines;
   (a5) determining remaining virtual machines in the first data structure as one subset of the first group of the virtual machines upon the condition that a number of the remaining virtual machines in the first data structure is less than or equal to two;

(a6) removing the virtual machines in the selected subset from the first data structure upon the condition that the number of the remaining virtual machines in the first data structure is greater than two, executing an operation of N1=N1−1, and returning to step (a2).

4. The method according to claim 3, wherein the number "N0" of the host computers need to keep working is determined by a formula of $N0=\text{int}(U_{total} \div U_{threshold})+1$, "$U_{threshold}$" represents a threshold value of the CPU usage, "int( )" represents a function to obtain a round number of a division value of "$U_{total} \div U_{threshold}$".

5. The method according to claim 3, wherein the number "N0" of the host computers need to keep working is a preset value.

6. The method according to claim 1, wherein the second group of the virtual machines is obtained by:
  (b1) obtaining the resource usages of the virtual machines from the host computers, and storing a name of each of the virtual machines and corresponding resource usage into a second data structure;
  (b2) calculating a summation "$U_{total}$" of the resource usages in the second data structure;
  (b3) calculating a second average value "Vavg2" of the resource usage in each of the host computers used to allocate the virtual machines according to a formula of $\text{Vavg2}=U_{total} \div N2$, wherein "N2" represents a number of the host computers used to allocate the virtual machines, an initial value of "N2" equal to a total number of the host computers;
  (b4) searching for one or more subsets of the virtual machines in the second data structure such that a summation of the resource usages in the searched subset is greater than the second average value "Vavg2," selecting a subset whose summation is minimum, and determining the selected subset as one subset of the second group of the virtual machines;
  (b5) determining remaining virtual machines in the second data structure as one subset of the second group of the virtual machines upon the condition that a number of the remaining virtual machines in the second data structure is less than or equal to two;
  (b6) removing the virtual machines in the selected subset from the second data structure upon the condition that the number of the remaining virtual machines in the second data structure is greater than two, executing an operation of N2=N2−1, and returning to step (b2).

7. A control computer, comprising:
a storage device;
at least one processor; and
one or more modules that are stored in the storage device and executed by the at least one processor, the one or more modules comprising:
a command generating module that generates a power management command for managing power of a plurality of host computers;
a command determining module that determines a command type of the power management command, the command type comprising a first type and a second type;
a grouping module that groups virtual machines installed in the plurality of host computers in a first group at a first time according to an average value of resource usages of the virtual machines upon the condition that the command type is the first type, the first group of the virtual machines being obtained by searching for one or more subsets of the virtual machines such that a summation of the resource usages in the searched subset is greater than the average value, selecting a subset whose summation is minimum, and determining the selected subset as one subset of the first group of the virtual machines;
a relocating module that relocates the virtual machines in the host computers based on the first group of the virtual machines, and closes idle host computers that do not include any virtual machine;
the grouping module that further powers on closed host computers upon the condition that the command type is the second type, groups the virtual machines in a second group at a second time according to the resource usages of the virtual machines; and
the relocating module that relocates the virtual machines into each of the plurality of host computers based on the second group of the virtual machines.

8. The control computer according to claim 7, wherein the power management command is generated upon the condition that a specific time arrives or the resource usages of the virtual machines matches a specific criteria.

9. The control computer according to claim 7, wherein the first group of the virtual machines is obtained by:
  (a1) obtaining the resource usages of the virtual machines from the host computers, and storing a name of each of the virtual machines and corresponding resource usage into a first data structure;
  (a2) calculating a summation "$U_{total}$" of the resource usages in the first data structure;
  (a3) calculating a first average value "Vavg1" of the resource usage of each of the host computers used to allocate the virtual machines according to a formula of $\text{Vavg1}=U_{total} \div N1$, wherein "N1" represents a number of the host computers used to allocate the virtual machines, an initial value of "N1" equal to a number "N0" of the host computers need to keep working;
  (a4) searching for one or more subsets of the virtual machines in the first data structure such that a summation of the resource usages in the searched subset is greater than the first average value "Vavg1," selecting a subset whose summation is minimum, and determining the selected subset as one subset of the first group of the virtual machines;
  (a5) determining remaining virtual machines in the first data structure as one subset of the first group of the virtual machines upon the condition that a number of the remaining virtual machines in the first data structure is less than or equal to two;
  (a6) removing the virtual machines in the selected subset from the first data structure upon the condition that the number of the remaining virtual machines in the first data structure is greater than two, executing an operation of N1=N1−1, and returning to step (a2).

10. The control computer according to claim 9, wherein the number "N0" of the host computers need to keep working is determined by a formula of $N0=\text{int}(U_{total} \div U_{threshold})+1$, "$U_{threshold}$" represents a threshold value of the CPU usage, "int( )" represents a function to obtain a round number of a division value of "$U_{total} \div U_{threshold}$".

11. The control computer according to claim 9, wherein the number "N0" of the host computers need to keep working is a preset value.

12. The control computer according to claim 7, wherein the second group of the virtual machines is obtained by:
  (b1) obtaining the resource usages of the virtual machines from the host computers, and storing a name of each of the virtual machines and corresponding resource usage into a second data structure;
  (b2) calculating a summation "$U_{total}$" of the resource usages in the second data structure;

(b3) calculating a second average value "Vavg2" of the resource usage in each of the host computers used to allocate the virtual machines according to a formula of Vavg2=$U_{total}$÷N2, wherein "N2" represents a number of the host computers used to allocate the virtual machines, an initial value of "N2" equal to a total number of the host computers;

(b4) searching for one or more subsets of the virtual machines in the second data structure such that a summation of the resource usages in the searched subset is greater than the second average value "Vavg2," selecting a subset whose summation is minimum, and determining the selected subset as one subset of the second group of the virtual machines;

(b5) determining remaining virtual machines in the second data structure as one subset of the second group of the virtual machines upon the condition that a number of the remaining virtual machines in the second data structure is less than or equal to two;

(b6) removing the virtual machines in the selected subset from the second data structure upon the condition that the number of the remaining virtual machines in the second data structure is greater than two, executing an operation of N2=N2−1, and returning to step (b2).

13. A non-transitory storage medium having stored thereon instructions that, when executed by a processor of a control computer, causes the control computer to perform a method for managing power of a plurality of host computers, the method comprising:

generating a power management command for the plurality of host computers;

determining a command type of the power management command, the command type comprising a first type and a second type;

grouping virtual machines installed in the plurality of host computers in a first group at a first time according to an average value of resource usages of the virtual machines upon the condition that the command type is the first type, the first group of the virtual machines being obtained by searching for one or more subsets of the virtual machines such that a summation of the resource usages in the searched subset is greater than the average value, selecting a subset whose summation is minimum, and determining the selected subset as one subset of the first group of the virtual machines;

relocating the virtual machines in the host computers based on the first group of the virtual machines, and closing idle host computers that do not include any virtual machine;

powering on closed host computers upon the condition that the command type is the second type, grouping the virtual machines in a second group at a second time according to the resource usages of the virtual machines; and relocating the virtual machines into each of the plurality of host computers based on the second group of the virtual machines.

14. The non-transitory storage medium according to claim 13, wherein the power management command is generated upon the condition that a specific time arrives or the resource usages of the virtual machines matches a specific criteria.

15. The non-transitory storage medium according to claim 13, wherein the first group of the virtual machines is obtained by:

(a1) obtaining the resource usages of the virtual machines from the host computers, and storing a name of each of the virtual machines and corresponding resource usage into a first data structure;

(a2) calculating a summation "$U_{total}$" of the resource usages in the first data structure;

(a3) calculating a first average value "Vavg1" of the resource usage of each of the host computers used to allocate the virtual machines according to a formula of Vavg1=$U_{total}$÷N1, wherein "N1" represents a number of the host computers used to allocate the virtual machines, an initial value of "N1" equal to a number "N0" of the host computers need to keep working;

(a4) searching for one or more subsets of the virtual machines in the first data structure such that a summation of the resource usages in the searched subset is greater than the first average value "Vavg1," selecting a subset whose summation is minimum, and determining the selected subset as one subset of the first group of the virtual machines;

(a5) determining remaining virtual machines in the first data structure as one subset of the first group of the virtual machines upon the condition that a number of the remaining virtual machines in the first data structure is less than or equal to two;

(a6) removing the virtual machines in the selected subset from the first data structure upon the condition that the number of the remaining virtual machines in the first data structure is greater than two, executing an operation of N1=N1−1, and returning to step (a2).

16. The non-transitory storage medium according to claim 15, wherein the number "N0" of the host computers need to keep working is determined by a formula of N0=int ($U_{total}$÷$U_{threshold}$)+1, "$U_{threshold}$" represents a threshold value of the CPU usage, "int( )" represents a function to obtain a round number of a division value of "$U_{total}$÷$U_{threshold}$".

17. The non-transitory storage medium according to claim 15, wherein the number "N0" of the host computers need to keep working is a preset value.

18. The non-transitory storage medium according to claim 13, wherein the second group of the virtual machines is obtained by:

(b1) obtaining the resource usages of the virtual machines from the host computers, and storing a name of each of the virtual machines and corresponding resource usage into a second data structure;

(b2) calculating a summation "$U_{total}$" of the resource usages in the second data structure;

(b3) calculating a second average value "Vavg2" of the resource usage in each of the host computers used to allocate the virtual machines according to a formula of Vavg2=$U_{total}$÷N2, wherein "N2" represents a number of the host computers used to allocate the virtual machines, an initial value of "N2" equal to a total number of the host computers;

(b4) searching for one or more subsets of the virtual machines in the second data structure such that a summation of the resource usages in the searched subset is greater than the second average value "Vavg2," selecting a subset whose summation is minimum, and determining the selected subset as one subset of the second group of the virtual machines;

(b5) determining remaining virtual machines in the second data structure as one subset of the second group of the virtual machines upon the condition that a number of the remaining virtual machines in the second data structure is less than or equal to two;

(b6) removing the virtual machines in the selected subset from the second data structure upon the condition that the number of the remaining virtual machines in the second data structure is greater than two, executing an operation of N2=N2−1, and returning to step (b2).

19. The non-transitory storage medium according to claim 13, wherein the medium is selected from the group consisting of a hard disk drive, a compact disc, a digital video disc, and a tape drive.

* * * * *